Aug. 16, 1938.　　　　　R. TINKER　　　　　2,127,347
CULTIVATOR PLOW
Filed Sept. 11, 1937　　　2 Sheets-Sheet 1
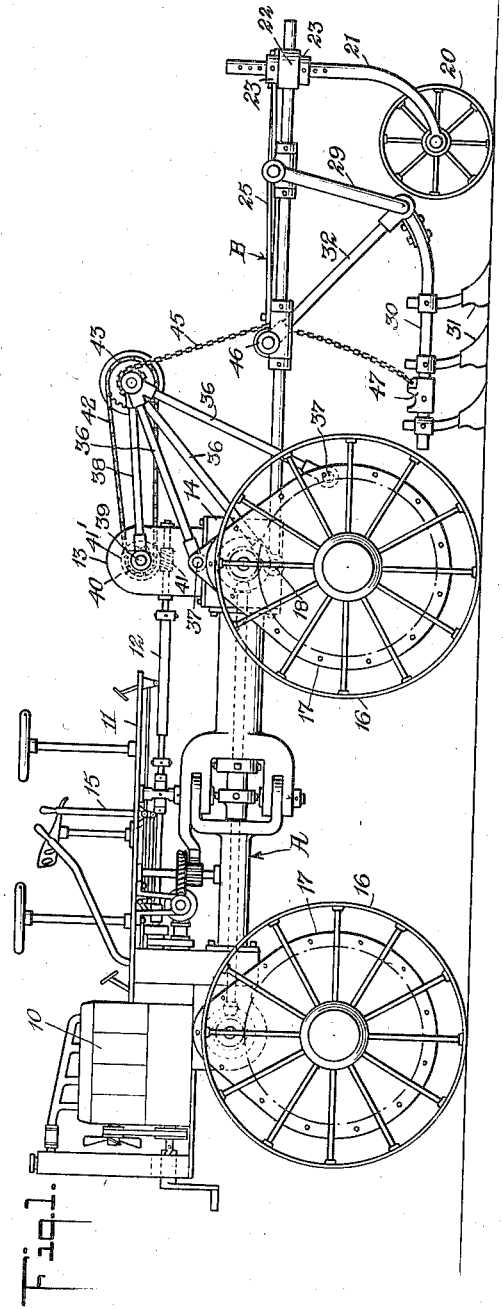
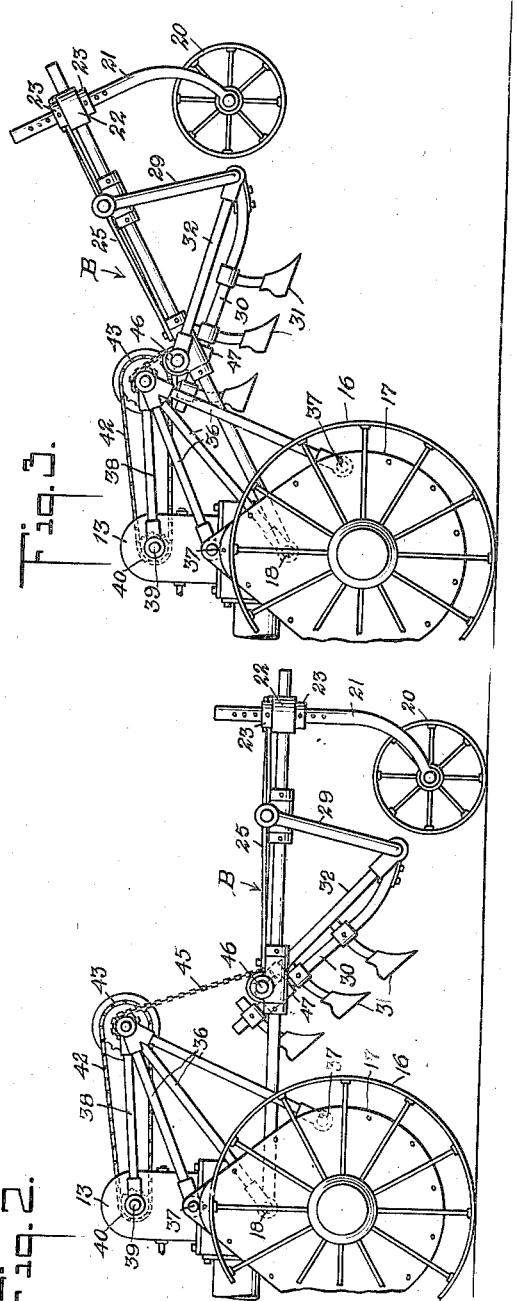
WITNESSES
INVENTOR
Ralph Tinker
BY
Munn, Anderson & Liddy
ATTORNEYS Aug. 16, 1938.　　　　R. TINKER　　　　2,127,347
CULTIVATOR PLOW
Filed Sept. 11, 1937　　　2 Sheets-Sheet 2

WITNESSES

INVENTOR
Ralph Tinker
BY
ATTORNEYS

Patented Aug. 16, 1938

2,127,347

UNITED STATES PATENT OFFICE 2,127,347

CULTIVATOR PLOW

Ralph Tinker, Fountain City, Wis.

Application September 11, 1937, Serial No. 163,379

5 Claims. (Cl. 97—50)

This invention relates to cultivator plows, and more particularly to a tractor driven power operated means for propelling gang plows and for elevating the plows for turning and for transportation.

A further object is to provide an improved advancing folding lift cultivator plow which embodies many novel features of construction and combinations and arrangements of parts, all of which will be more fully hereinafter described and pointed out in the claims.

In the accompanying drawings—

Fig. 1 is a view in side elevation illustrating my improved cultivator plow;

Fig. 2 is a view in side elevation of the plow and front portion of the tractor showing the gang plows in elevated position;

Fig. 3 is a view similar to Fig. 2 showing the cultivator as a whole in elevated position;

Figure 4:
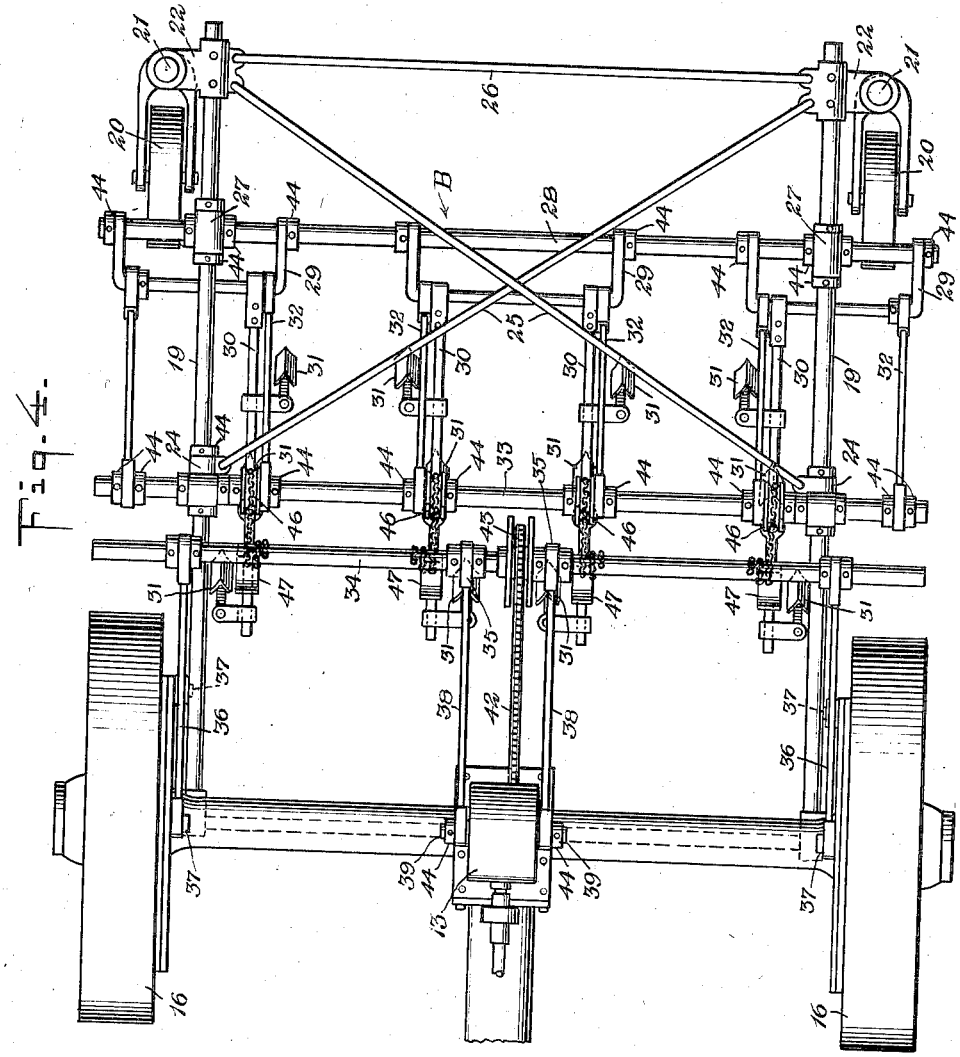
Fig. 4 is a plan view on a large scale of Fig. 2.

The reference character A is employed to indicate generally a tractor having a motor 10 and an operator's platform 11 containing the means for controlling the tractor. The driving and steering mechanism of the tractor form no part of the present invention.

However, it is understood that the motor 10 transmits motion to a longitudinally extending shaft 12 projecting into a gear housing 13 on the gear box 14 at the forward end of the tractor. It is understood that this shaft 12 is power driven in both directions and is capable of a neutral position when it is idle, and I of course do not limit myself to any particular means for controlling the motion of the shaft 12 but I have shown a hand lever 15 on the operator's platform 11 which might be utilized for the purpose.

The tractor A is provided with four wheels and adjacent each wheel 16 a gear casing 17 is located and has a fixed relationship to the frame of the tractor. The four gear casings 17 are connected to the gear box 14 by towing rods 18.

My improved cultivator indicated generally by the reference character B includes a pair of parallel towing beams 19—19 which are pivotally connected at their inner ends to the towing rods 18. At their forward ends they are supported by caster wheels 20 and these caster wheels 20 are mounted in caster shanks 21 having rotary mounting in bearing blocks 22 secured to the forward ends of the beams 19. It is understood that the shanks 21 are adjustable vertically in bearing blocks 22 to vary the depth of plowing, and for this purpose set collars 23 are secured to the shanks 21 above and below the bearing blocks 22.

The beams 19 intermediate their ends are provided with bearing blocks 24 and these bearing blocks are connected by crossed sway braces 25 with the bearing blocks 22. The bearing blocks 22 are also connected by a tie brace 26.

On the beams 19 between bearing blocks 22 and 24 other bearing blocks 27 are located and support a transverse shaft 28. Drop hitches 29 are mounted on the shaft 28 and to these hitches 29 the forward ends of the beams 30 of gang plows 31 are connected. These hitches 29 are connected by links 32 with a transverse shaft 33 mounted in the bearing blocks 24 above referred to.

A transverse shaft 34 is supported in four bearing blocks 35 to the rear and in a plane above the shaft 33. The bearing blocks 35 adjacent the outer ends of shaft 34 are connected by angle brackets 36 with fixed pins 37 on the gear cases 17. The bearing blocks 35 adjacent the center of shaft 34 are connected by arms 38 with a shaft 39 which extends transversely through the gear box 13.

On the shaft 39 within the gear box 13 a worm wheel 40 is secured and is driven by a worm 41 on shaft 12. This shaft 39 also has secured thereon within the gear box 13 a sprocket wheel 41' which is connected by an endless sprocket chain 41 with a sprocket wheel 43 affixed to shaft 34 to transmit motion to the latter.

All of the bearing blocks above referred to, with the exception of the bearing blocks 22, have a more or less loose or flexible connection with their shafts and are held against undue movement by set collars 44 so that the frame of the cultivator as a whole has a certain amount of lateral sway or movement to compensate for an uneven surface of the ground.

Chains 45 are secured to shaft 34, are passed over shives 46 on shaft 33 and are secured at their ends to saddle blocks 47 secured to the beams 30 of the gang plows 31.

The operation of the cultivator above described is as follows: Fig. 1 shows a plow in normal position for operation. When it is desired to elevate the plow, motion is imparted to the shaft 34 through the medium of the mechanism above described winding the chains 45 thereon, thus drawing the gang plows upwardly until the saddle blocks 47 engage the shives 46 which is the position shown in Fig. 2 of the drawings. If it is desired to elevate the cultivator as a whole, this motion of shaft 34 is continued and by reason of the fact that the saddle blocks 47 are in engagement with the shives 46 a continued upward pull on the blocks 47 will elevate the cultivator as a whole, the towing beams 19 pivoting on the towing rods 18 to the position shown in Fig. 3 of the drawings, when the plow can be readily transported from place to place.

While I have illustrated and described what I believe to be the preferred embodiments of my invention, it is obvious that various changes might be made in the general form and arrangement of parts without departing from the invention, and hence I do not limit myself to the specific details set forth but consider myself at liberty to make such changes and alterations as fairly fall within the spirit and scope of the appended claims.

I claim:

1. In combination, a power driven tractor and a cultivator frame pivotally connected thereto, caster wheels supporting the free ends of the cultivator frame, gang plows pivotally connected to the frame, a power driven shaft supported by the tractor, and chains connecting said shaft with the gang plows, a transverse shaft on the cultivator frame, shives on said shaft over which the chains are passed, and saddle blocks on the gang plows adapted when moved upwardly by the chain to engage the shives, and when continued upward movement of the chain is had cause an upward pivotal movement of the cultivator frame.

2. In combination, a power driven tractor and a cultivator frame pivotally connected thereto, caster wheels supporting the free ends of the cultivator frame, gang plows pivotally connected to the frame, a power driven shaft supported by the tractor, and chains connecting said shaft with the gang plows, a transverse shaft on the cultivator frame, shives on said shaft over which the chains are passed, and saddle blocks on the gang plows adapted when moved upwardly by the chain to engage the shives and then continued upward movement of the chain is had cause an upward pivotal movement of the cultivator frame, a gear box on the tractor, a driving shaft projecting into the gear box, a transverse shaft in the gear box, a worm and worm wheel operating and connecting the driving shaft and the last-mentioned shaft, sprocket wheels on the last-mentioned shaft and on the shaft to which the chains are secured, and a sprocket chain connecting said sprocket wheels.

3. The combination of a power driven tractor, transverse towing rods on the tractor, longitudinally extending towing beams pivotally connected to the towing rods, braces connecting said beams, caster wheels supporting the free ends of the beams, a transverse shaft supported by the beams, drop hitches pivotally connected to the transverse shaft, braces connecting the drop hitches with a second transverse shaft on the towing beams, gang plows pivotally connected to the drop hitches, and power driven means on the tractor for elevating the gang plows.

4. The combination of a power driven tractor, transverse towing rods on the tractor, longitudinally extending towing beams pivotally connected to the towing rods, braces connecting said beams, caster wheels supporting the free ends of the beams, a transverse shaft supported by the beams, drop hitches pivotally connected to the transverse shaft, braces connecting the drop hitches with a second transverse shaft on the towing beams, gang plows pivotally connected to the drop hitches, and power driven means on the tractor for elevating the gang plows, and means on the gang plows to engage devices on the last-mentioned shaft to cause the cultivator as a whole to be elevated when continued upward movement of the plow gangs is had.

5. In combination with a power driven tractor, a cultivator including parallel towing beams pivotally connected to the tractor, bearing blocks on the towing beams, transverse shafts mounted in the bearing blocks, braces connecting the bearing blocks, set collars on the beams on opposite sides of the bearing blocks loosely holding said blocks, drop hitches pivotally connected to one of said shafts, gang plows pivotally connected to the hitches, and power operated means to elevate the plows and the cultivator as a whole.

RALPH TINKER.